United States Patent
Ito et al.

(10) Patent No.: US 7,667,436 B2
(45) Date of Patent: *Feb. 23, 2010

(54) ENERGY STORAGE TYPE FEEDER VOLTAGE COMPENSATION APPARATUS AND METHOD OF CONTROLLING FEEDER VOLTAGE

(75) Inventors: Tomomichi Ito, Hitachi (JP); Tetsuya Kato, Hitachiota (JP); Takashi Ikimi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/177,417

(22) Filed: Jul. 22, 2008

(65) Prior Publication Data

US 2008/0284376 A1 Nov. 20, 2008

Related U.S. Application Data

(63) Continuation of application No. 11/285,143, filed on Nov. 23, 2005, now Pat. No. 7,402,982.

(30) Foreign Application Priority Data

Nov. 26, 2004 (JP) ............................. 2004-342190

(51) Int. Cl.
*H02J 7/00* (2006.01)
*H02J 7/04* (2006.01)
*B61C 3/00* (2006.01)

(52) U.S. Cl. ...................... 320/150; 320/127; 320/128; 320/152; 105/35; 105/49; 105/50

(58) Field of Classification Search ................. 320/132, 320/136, 150, 152, 153, 50; 104/287, 288
See application file for complete search history.

(56) References Cited

U.S. PATENT DOCUMENTS 5,280,418 A * 1/1994 Griffin ......................... 363/34

FOREIGN PATENT DOCUMENTS

JP 11-91415 4/1999

OTHER PUBLICATIONS

"Meiden Review", vol. 287, 2002, No. 6, pp. 4-7.

* cited by examiner

*Primary Examiner*—Edward Tso
*Assistant Examiner*—Johali A Torres Ruiz
(74) *Attorney, Agent, or Firm*—Antonelli, Terry, Stout & Kraus, LLP.

(57) ABSTRACT

An energy saving type feeder voltage compensation apparatus improved in availability at low temperatures, wherein when a electric energy storage apparatus is lower in temperature than a predetermined value, an output voltage output to a feeder side is made equal to or higher than a no-load output voltage of a substation connected in parallel. Power is supplied to a power running rolling stock preferentially from the electric energy storage apparatus. The heating value of the secondary battery is increased and the battery temperature is raised by this discharging, whereby internal resistance of the electric energy storage apparatus is lowered, and the charging and discharging loss is suppressed, and the efficiency and availability of the energy saving type feeder voltage compensation apparatus as a whole are improved.

20 Claims, 9 Drawing Sheets

ENERGY STORAGE TYPE FEEDER VOLTAGE COMPENSATION APPARATUS AND METHOD OF CONTROLLING FEEDER VOLTAGE

CROSS-REFERENCE TO RELATED APPLICATIONS

This application is a continuation of U.S. application Ser. No. 11/285,143, filed Nov. 23, 2005 (now U.S. Pat. No. 7,402,982), the entire disclosure of which is hereby incorporated by reference.

BACKGROUND OF THE INVENTION

The present invention relates to an energy storage type feeder voltage compensation apparatus and a method of controlling feeder voltage in which a secondary battery is connected to a feeder of an electric railroad via a power converter to absorb surplus power on the feeder and supply power from a secondary battery in response to power demand from power running rolling stocks.

In recent years, in a feeder system for supplying power from a substation to an electric rolling stock, the electric rolling stock utilizes regenerative brake with the object of power saving. This regenerative brake converts kinetic energy of the electric rolling stock to electric energy by using an inverter mounted on the electric rolling stock, regenerates the electric energy to the feeder, and decelerates the electric rolling stock. The electric energy generated by the regenerative brake is consumed as power running energy of other electric rolling stocks. As a result, energy saving in the feeder system can be attained.

If higher electric energy than needed in the neighborhood of the regenerative rolling stock, i.e., surplus regenerative power is generated, however, the voltage at a receiving point on the regenerative rolling stock rises. In the rolling stock, therefore, the brake must be altered from the regenerative brake to mechanical brake for the purpose of overvoltage protection. As a result, not only the electric rolling stock becomes uncomfortable to ride in, but also the power saving in the feeder system is aggravated.

To solve this problem, a method of storing surplus power in an energy storage apparatus and discharging the stored power as energy at the time of power running of the rolling stock is disclosed in JP-A-11-91415.

A control method for a feeder voltage compensation apparatus including an energy storage apparatus and a power converter is disclosed in MEIDEN REVIEW, Vol. 287, 2002, No. 6, pp. 4-7. An electric double layer capacitor is used as the energy storage apparatus. If the feeder voltage exceeds an upper limit value, the energy storage apparatus is charged. If the feeder voltage becomes lower than a lower limit value, the energy storage apparatus is discharged to suppress the variation in feeder voltage. In addition, when the feeder voltage is in a predetermined range, charging and discharging are conducted between the feeder and the energy saving apparatus so as to make the voltage on the electric double layer capacitor constant. As a result, regenerative power is used effectively, and the charging rate of the power saving apparatus is controlled. In addition, stable operation of the device is ensured.

If a secondary battery is used in the power saving apparatus using the technique disclosed in Meiden Periodical Report, Vol. 287, 2002, No. 6, pp. 4-7, however, the internal resistance value of the secondary battery becomes large at low temperatures, and chargeable and dischargeable power is restricted, resulting in a problem of a lowered availability of the device.

SUMMARY OF THE INVENTION

An object of the present invention is to provide an energy storage type feeder voltage compensation apparatus and a method of controlling the feeder voltage, that are capable of ensuring chargeable and dischargeable power that is demanded from a secondary battery as a feeder voltage compensation apparatus, even at a low temperature state, and improving the availability of the apparatus as a whole.

In accordance with an aspect of the present invention, in a feeder system using a power converter connected between a feeder and a secondary battery so as to give and receive power in a bilateral direction, to cause surplus power on the feeder to charge the secondary battery and cause the secondary battery to feed power in response to power demand from a power running rolling stock, discharging from the secondary battery to the feeder side is started when a predetermined discharging start condition, such as falling of the feeder side voltage, is satisfied, and the discharging start condition is expanded when the temperature of the secondary battery has become lower than a predetermined temperature.

In a preferred mode for carrying out the present invention, a discharging start voltage for starting discharging from the secondary is changed over to a higher value to promote discharging from the secondary battery, when the temperature of the secondary battery is lower than a predetermined temperature.

In accordance with another aspect of the present invention, two voltage compensation apparatuses are connected to a feeder supplied with power from a substation, and the two voltage compensation apparatuses are controlled to conduct charging and discharging between them, when the temperature of either of the voltage compensation apparatuses has fallen.

In a preferred mode for carrying out the present invention, the two voltage compensation apparatuses are controlled to conduct charging and discharging alternately by expanding the discharging start conditions of the two voltage compensation apparatuses alternately, when a temperature of the secondary battery is lower than a predetermined temperature.

In a preferred mode for carrying out the present invention, it is possible to lower the internal resistance of the secondary battery and decrease the charging and discharging loss, by restoring the temperature of the secondary battery that has fallen to a predetermined temperature.

In a preferred mode for carrying out the present invention, it is possible to increase the charging and discharging power and improve the availability of the voltage compensation apparatus as a whole.

Other objects, features and advantages of the invention will become apparent from the following description of the embodiments of the invention taken in conjunction with the accompanying drawings.

DESCRIPTION OF THE EMBODIMENTS

Other objects and features of the present invention are made clear by the following description of embodiments.

First Embodiment

A first embodiment of the present invention will now be described with reference to FIGS. 1 to 5.

Figure 1:
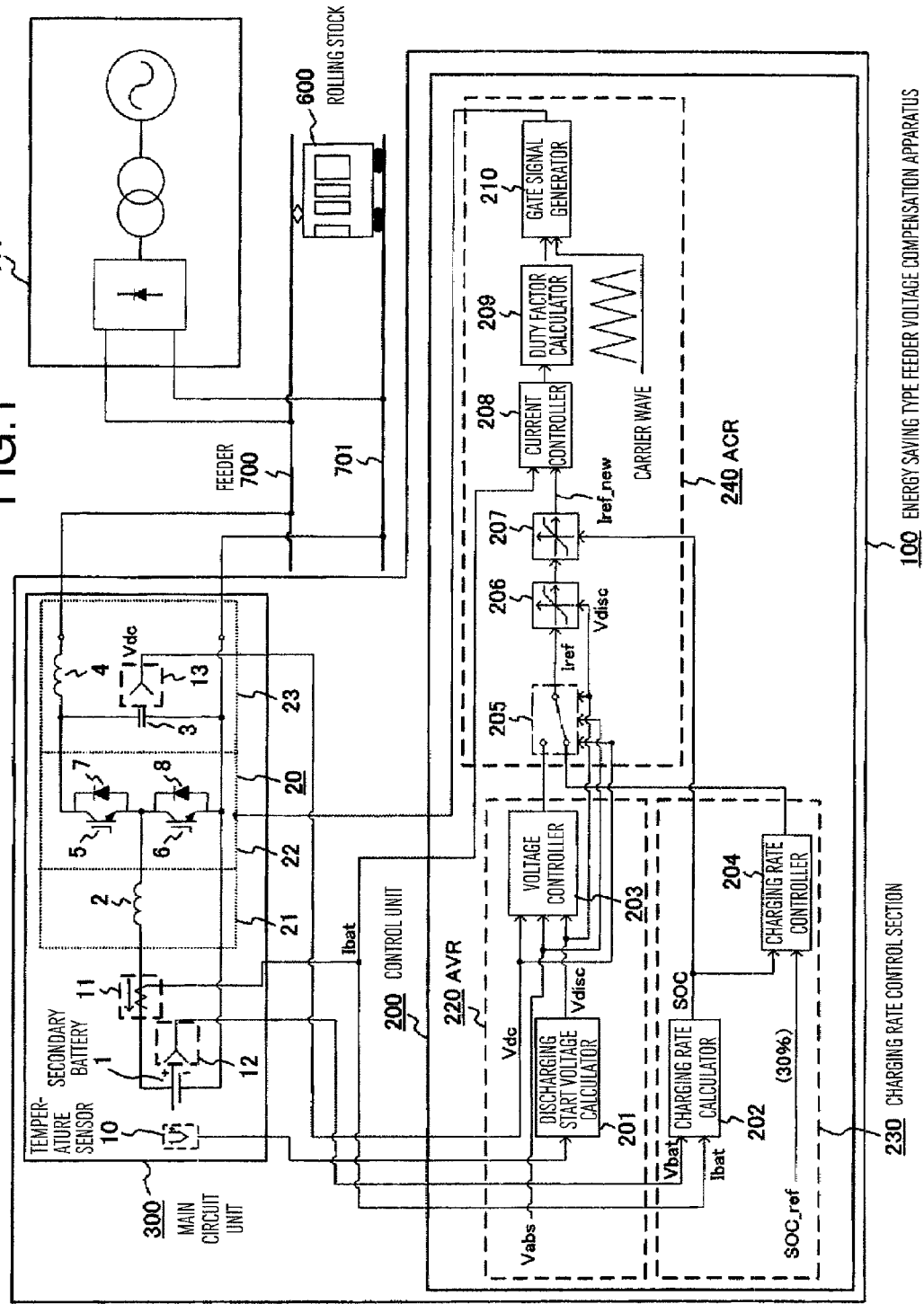
FIG. 1 is a general configuration diagram of an energy storage type feeder voltage compensation apparatus according to a first embodiment of the present invention.

FIG. 1 is a general configuration diagram of an energy type feeder voltage compensation apparatus according to a first embodiment of the present invention. An energy saving type feeder voltage compensation apparatus (hereafter referred to simply as voltage compensation apparatus) 100, a substation 500, an electric rolling stock 600, a feeder 700, and rails 701 are shown. The voltage compensation apparatus 100 is connected in parallel to the substation 500 and the rolling stock 600 via the feeder 700 and the rails 701. The voltage compensation apparatus 100 includes a main circuit unit 300 and a control unit 200. First, the main circuit unit 300 will now be described.

In the main circuit unit 300, a secondary battery 1 is connected to the feeder 700 and the rails 701 via a power converter 20. In the present embodiment, the power converter 20 is formed by interposing a switching unit 22 between two filter units 21 and 23. The switching unit 22 is a bilateral chopper, i.e., a DC-DC converter. The switching unit 22 includes an IGBT 5 and an IGBT 6 connected in series, and free wheel diodes 7 and 8 connected respectively back-to-back to the IGBTs 5 and 6. The filter unit 21 includes a reactor 2. The filter unit 23 includes a reactor 4 and a capacitor 3. As well known, the bilateral chopper 20 has a function of boosting the terminal voltage of the secondary battery 1 by using PWM control, and discharging the boosted voltage to the feeder 700. Furthermore, the bilateral chopper 20 has a function of lowering the voltage on the feeder 700 and charging the secondary battery 1.

The control unit 200 will now be described.

The control unit 200 includes a voltage control section (AVR) 220, a charging rate control section 230, and a current control section (ACR) 240. The voltage control section 220 detects a feeder side voltage (capacitor voltage) Vdc of the power converter 20 by using a voltage detector 13, and calculates a charging/discharging current command value Iref for the secondary battery 1 in a voltage controller 203 so as to bring the feeder side voltage Vdc into a predetermined range. Its sign "+" represents a charging current command, and its sign "−" represents a discharging current command. Specifically, if the feeder side (capacitor 3) voltage Vdc of the power converter 20 is equal to or higher than a charging start voltage Vabs, the voltage control section 220 calculates the charging current command value Iref for the secondary 1 so as to reduce the deviation between Vabs and Vdc. Therefore, the charging start voltage Vabs can be said to be an upper limit value of the feeder side voltage Vdc of the power converter 20. Power is absorbed by charging the secondary battery 1 so as not to exceed the charging start voltage Vabs. On the other hand, if the feeder side voltage Vdc is equal to or lower than a discharging start voltage Vdisc, which is an output value of a discharging start voltage calculator 201, the voltage control section 220 calculates a discharging (minus charging) current command value Iref of the secondary battery 1 so as to reduce the deviation between the voltage Vdisc and the feeder side voltage Vdc. In other words, the discharging start voltage Vdisc can be said to be a lower limit value of the feeder side voltage Vdc of the power converter 20. The voltage controller (AVR) 203 is caused to supply power by discharging the secondary battery 1 so as to prevent the feeder side voltage Vdc from becoming lower than the voltage Vdisc.

In charging control, the charging start voltage Vabs, which is the upper limit value of the feeder side voltage Vdc, is set equal to a value that is several tens [V] higher than a no-load output voltage Vdc0 of the substation 500 so as to absorb only the surplus regenerative power that cannot be consumed completely by the power running rolling stock 600, into the secondary battery 1. When the rated value of the feeder voltage is 1500 [V], the no-load output voltage Vdc0 of the substation 500 is, for example, approximately 1600 [V].

When the feeder voltage has fallen, the voltage compensation apparatus 100 causes the secondary battery 1 to be discharged to the feeder 700. The discharging start voltage Vdisc is set equal to a value lower than the charging start voltage Vabs and the no-load output voltage Vdc0 to compensate the voltage drop.

The charging rate control section 230 includes a charging rate calculator 202 and a charging rate controller 204. The charging rate calculator 202 calculates a charging rate SOC of the secondary battery 1 on the basis of a secondary battery terminal voltage detected value Vbat and a secondary battery charging current detected value Ibat respectively detected by a voltage detector 12 and a current detector 11. For example, the charging rate SOC can be calculated as described below by taking the characteristics shown in FIG. 2 into consideration.

Figure 2:
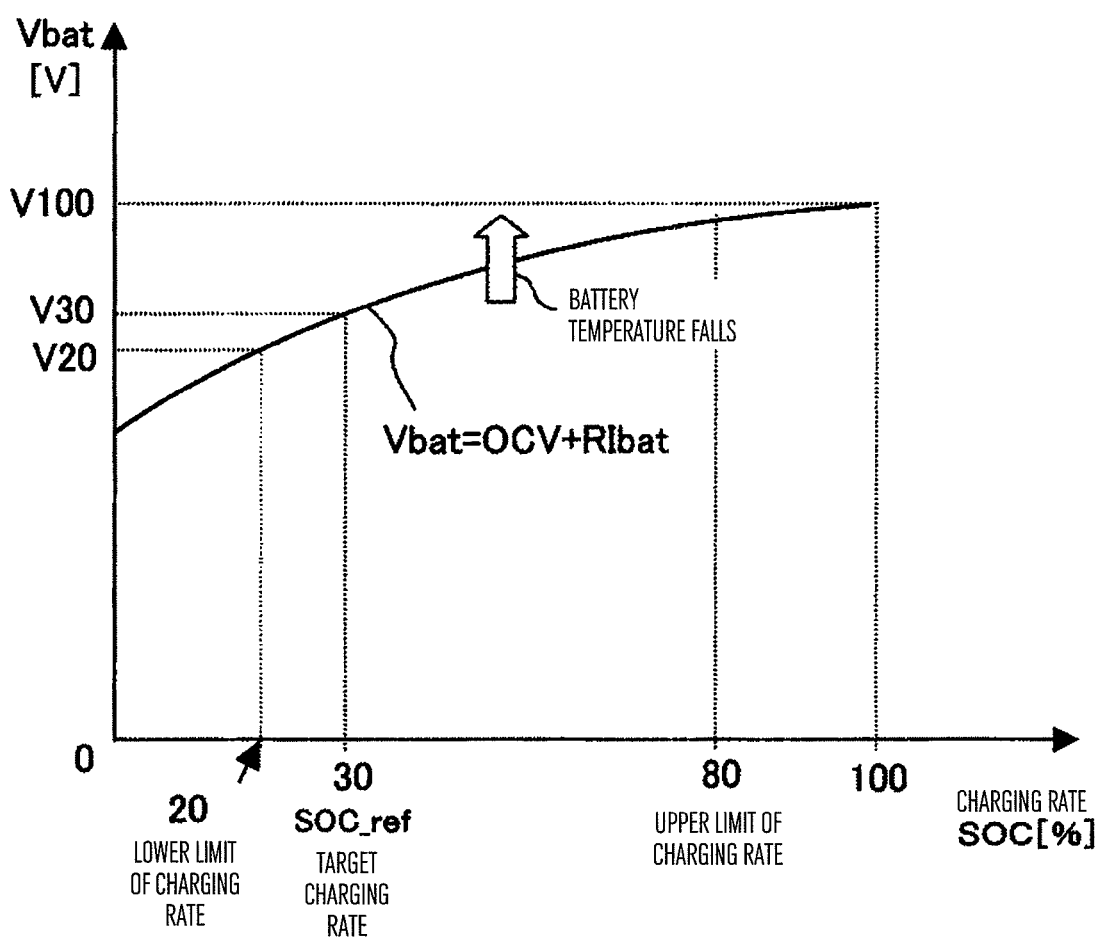
FIG. 2 is an exemplary graph of characteristics showing a terminal voltage as a function of a charging rate in a secondary battery.

FIG. 2 is an exemplary graph of characteristics showing the terminal voltage Vbat as a function of the charging rate SOC in the secondary battery 1. The battery terminal voltage Vbat is the sum of a battery voltage OCV and a voltage drop RIbat caused by internal resistance R. As shown in FIG. 2, the relation Vbat=OCV+RIbat is obtained. Since the internal resistance R changes largely according to the temperature, the charging rate calculator 202 calculates the charging rate SOC on the basis of the detected terminal voltage Vbat and current Ibat with the characteristics shown in FIG. 2 containing the internal resistance R taken into consideration. It is now supposed in the ensuing description that the upper limit of the charging rate is set equal to 80[%] and the lower limit of the charging rate is set equal to 20[%] as shown in FIG. 2. It is also supposed that a target charging rate SOC_ref in the case where voltage compensation is not demanded actively is 30[%]. The charging rate controller 204 calculates the charging/discharging current command value Iref for the secondary battery 1 so as to reduce the deviation between the charging rate command value SOC_ref, which is a fixed value of 30[%], and the charging rate SOC calculated by the charging rate calculator 202.

The current control section (ACR) 240 includes a changeover switch 205 for selecting the current command value, limiters 206 and 207 for limiting the current command value, a current controller 208, a duty factor calculator 209, and a gate signal generator 210. The changeover switch 205 changes over the current command value, which is its output value, according to which range the feeder side voltage Vdc of the power converter 20 belongs.

First, if the feeder side voltage Vdc is equal to or higher than the discharging start voltage (lower limit value) Vdisc and lower than the charging start voltage (upper limit value) Vabs, active voltage compensation running is not necessary, and consequently the ACR 240 is operated by an output value of the charging rate controller 204. As described earlier, therefore, charging and discharging are controlled so as to attain the charging rate command value SOC_ref, which is a fixed value of 30[%].

On the other hand, if the feeder side voltage Vdc does not satisfy the above-described condition, the active voltage compensation operation is necessary and an output value of the voltage controller 203 is output to the limiter 206 as the current command value Iref. The limiter 206 is supplied with the current command value Iref, which is the output value of the changeover switch 205, and the discharging start voltage Vdisc. When the discharging start voltage Vdisc is lower than the no-load output voltage Vdc0 (for example, 1,600 [V]) of the substation 500, an upper limit of the current command value Iref, i.e., a charging current that absorbs power from the feeder is allowed to an upper limit value determined by a standard device rating. If the discharging start voltage Vdisc is low when power is supplied from the secondary battery 1 to the feeder, it is not urgent. Therefore, the minus current on the discharging side is limited to be lower than a rated value and gentle discharging is conducted, resulting in an improved discharging efficiency of the secondary battery 1.

Subsequently, when the discharging start voltage Vdisc is set equal to or higher than the no-load output voltage Vdc0 of the substation 500, the secondary battery 1 is in situations where warming up running described later is demanded. Therefore, the discharging side current limit value for the current command value Iref is spread to the rated value. As a result, the discharging current can be let flow up to the device rated value, and the internal heating in the secondary battery 1 can be increased.

The limiter 207 has a function of preventing the secondary battery 1 from being overcharged or over-discharged. The limiter 207 is supplied with an output value of the limiter 206 and the output value SOC of the charging rate calculator 202. If the charging rate SOC is in the above-described allowable variation range 20 to 80[%], the current command value is allowed up to the value determined by the device rating. On the other hand, if the charging rate SOC is equal to or greater than the allowable variation range 80[%], a limit value of the limiter 207 in the charging direction is set equal to 0. If the charging rate SOC is equal to or less than the allowable variation range 20[%], a limit value of the limiter 207 in the discharging direction is set equal to 0. Thus, the output value of the limiter 207 is output to the current controller 208. As a result, the secondary battery 1 can be prevented from being overcharged or over-discharged.

The current command value limited by the limiter 206 and the limiter 207 becomes a new current command value Iref_new, and it is input to the current controller 208. The current controller 208 is supplied with the current command value Iref_new from the limiter 207 and the secondary battery charging/discharging current Ibat detected by the current detector 11. The current controller 208 calculates a secondary battery side output voltage command value of the bilateral chopper 20 so as to decrease the deviation between the current command value Iref_new and the secondary battery charging/discharging current Ibat. The duty factor calculator 209 calculates a duty factor of the IGBTs 5 and 6 on the basis of the voltage command value input from the current controller 208, and outputs the duty factor to the gate signal generator 210. The gate signal generator 210 generates a gate signal for the IGBTs 5 and 6 on the basis of the duty factor input from the duty factor calculator 209 and a triangular wave, which is a carrier wave.

If the feeder side voltage Vdc of the power converter 20 exceeds the charging start voltage (upper limit value) Vabs, the energy saving type feeder voltage compensation apparatus 100 in the present embodiment thus absorbs power from the feeder 700 rapidly and suppresses a rise of the feeder voltage. If the feeder side voltage Vdc becomes lower than the discharging start voltage (lower limit value) Vdisc, the energy saving type feeder voltage compensation apparatus 100 gently discharges power toward the feeder and suppresses a drop in the feeder voltage. In addition, if the feeder side voltage Vdc is between Vdisc and Vabs and the active voltage compensation is unnecessary, the energy saving type feeder voltage compensation apparatus 100 executes the charging/discharging control so as to make the charging rate SOC of the secondary battery 1 approach the target value SOC_ref (30 [%]).

Operation of the discharging start voltage calculator 201, which is a principal portion of the present embodiment, will now be described.

The discharging start voltage calculator 201 is supplied with a value Tbat detected by a temperature sensor 10, which detects the temperature of the secondary battery 1. The discharging start voltage calculator 201 outputs the discharging start voltage Vdisc.

Figure 3:
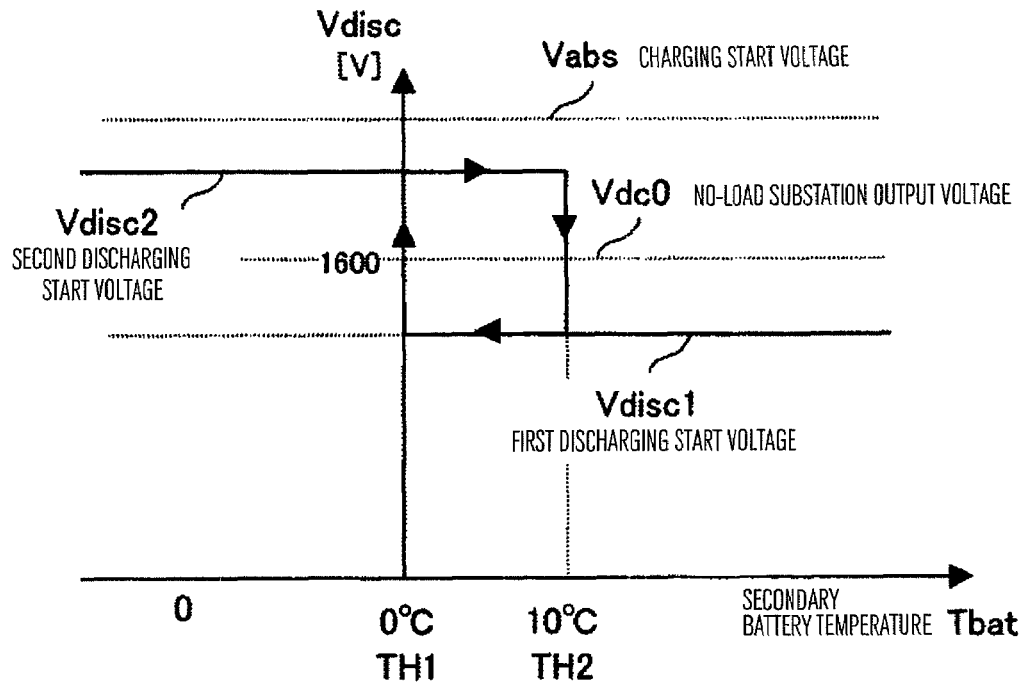
FIG. 3 is a diagram showing relations between a temperature of the secondary battery and a discharging start voltage in a first embodiment of the present invention.

FIG. 3 is a relation diagram between the temperature Tbat of the secondary battery 1 and the discharging start voltage Vdisc in the first embodiment of the present invention. If the temperature Tbat of the secondary battery 1 is an ordinary temperature, such as a temperature that is equal to or higher than a second predetermined temperature TH2 (for example, 10[° C.]), the discharging start voltage Vdisc is kept at a first discharging start voltage Vdisc1, which is lower than the no-load output voltage Vdc0 of the substation 500. If the temperature Tbat of the secondary battery 1 becomes lower than a first predetermined temperature TH1 (for example, 0[° C.]), however, the discharging start voltage Vdisc is switched to a second discharging start voltage Vdisc2, which is higher than the no-load output voltage Vdc0 of the substation 500 and which is lower than the charging start voltage Vabs. In addition, if the temperature Tbat of the secondary battery 1 rises up to the second predetermined temperature TH2 again, the discharging start voltage Vdisc is restored to the first discharging start voltage Vdisc1. Typically, therefore, the voltage compensation apparatus 100 conducts discharging for maintaining the voltage, only when the feeder side voltage Vdc has sufficiently fallen. It is desirable to set the discharging start voltage Vdisc1 equal to a value that is several hundreds [V] lower than the no-load output voltage Vdc0.

On the other hand, as for the case where the temperature Tbat of the secondary battery has fallen, the second discharging start voltage Vdisc2 is set to a value between the no-load output voltage Vdc0 and the charging start voltage Vabs.

The first and second predetermined temperatures TH1 and TH2 depend on a variation width allowed for the device capacity. For example, if the variation width allowed for the device capacity is 20[%], the first predetermined temperature TH1 should be set equal to a temperature at which the maximum charging/discharging current of the secondary battery 1 has decreased by 10[%]. The second predetermined temperature TH2 is set equal to a temperature that is several [° C.] higher than TH1 so as to prevent the voltage on the capacitor 3 from fluttering. Here, fluttering in the voltage on the capacitor 3 is suppressed by providing the relation between the discharging start voltage Vdisc and the temperature Tbat with hysteresis characteristics.

Figure 4:
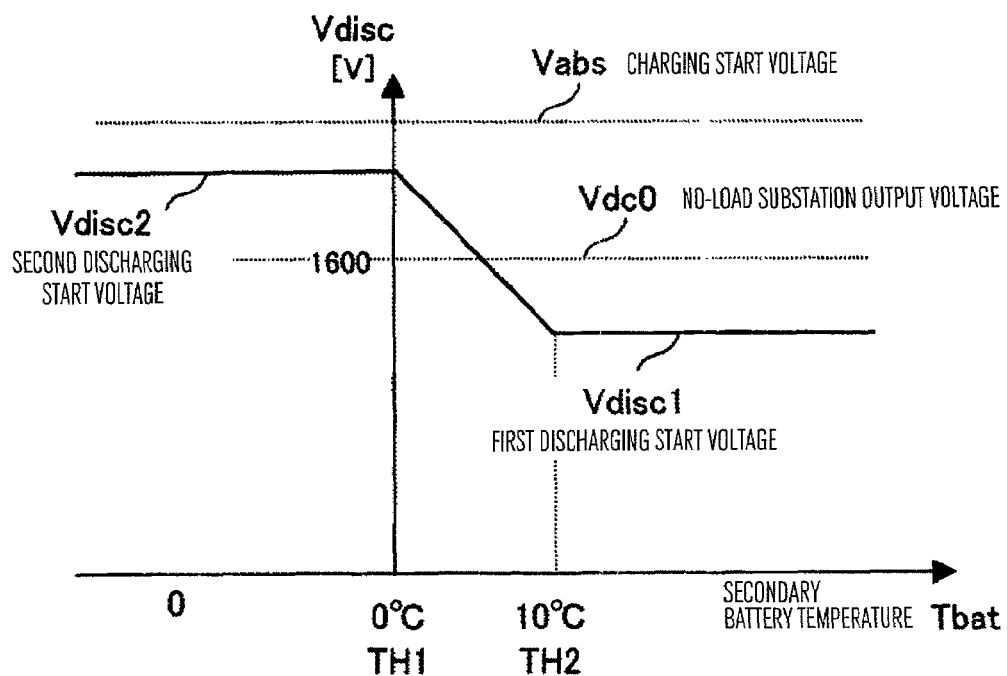
FIG. 4 is a diagram showing relations between the temperature of the secondary battery and discharging start voltage in a variant of the first embodiment of the present invention.

FIG. 4 is a diagram showing relations between the temperature Tbat of the secondary battery 1 and the discharging start voltage Vdisc in a variant of the first embodiment of the present invention. In order to prevent the voltage on the capacitor 3 from fluttering, the characteristics shown in FIG. 4 may be provided instead of those shown in FIG. 4. In other words, as the battery temperature Tbat falls from the second predetermined temperature TH2 to the first predetermined temperature TH1, the discharging start voltage Vdisc is continuously raised. As a result, as the battery temperature Tbat falls, the chances of discharging are increased to raise the temperature of the secondary battery. The charging/discharging efficiency is thus increased. In addition, it is possible to eliminate fluttering of the feeder side voltage Vdc of the power converter by a smooth change of the discharging start voltage Vdisc.

If the detected temperature Tbat of the secondary battery falls, the discharging start voltage Vdisc thus rises and discharging from the secondary battery 1 is conducted, resulting in a raised feeder side voltage (voltage on the capacitor 3) Vdc of the power converter. It is now supposed that the rolling stock 600 is accelerated in this situation. If power required for power running of the rolling stock 600 is less than the dischargeable power of the voltage compensation apparatus 100, all of the power running energy can be supplied from the voltage compensation apparatus 100. If the power running power of the rolling stock 600 is greater than the dischargeable power of the voltage compensation apparatus 100, power is supplied from both the voltage compensation apparatus 100 and the substation 500 to the rolling stock 600 and the voltage compensation apparatus 100 conducts the discharging running with its maximum discharging power. By raising the discharging start voltage Vdisc, therefore, it is possible in both conditions to give priority to supply of power to the power running rolling stock, increase the heat generated by the secondary battery 1, and improve the charging and discharging efficiency due to decrease of the internal resistance caused by a resultant temperature rise.

Even if the battery temperature fluctuates, the feeder side voltage Vdc of the power converter 20 is prevented from fluttering by providing the relation between the detected temperature value Tbat of the secondary battery 1 and the discharging start voltage Vdisc with hysteresis characteristics or continuously changing the discharging start voltage Vdisc.

An operation example of the present embodiment will now be described with reference to FIG. 3.

Figure 5:
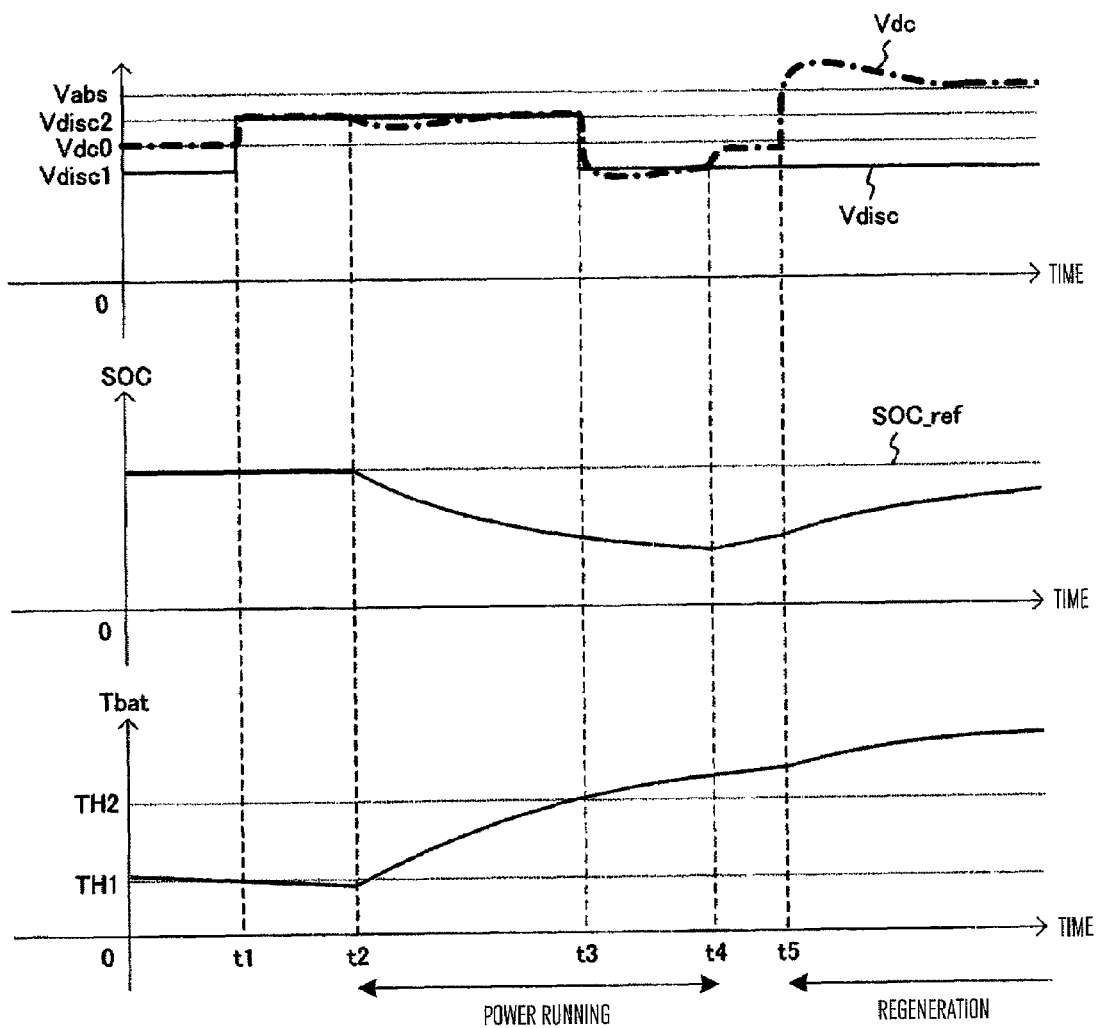
FIG. 5 is an operation waveform diagram of an energy saving type feeder voltage compensation apparatus according to a first embodiment of the present invention.

FIG. 5 is an operation waveform diagram of the energy saving type feeder voltage compensation apparatus according to the first embodiment of the present invention. The discharging start voltage Vdisc and the feeder side voltage (capacitor voltage) Vdc, the charging rate SOC, and the temperature Tbat of the secondary battery 1 are shown in the cited order from the top. It is now supposed that the detected temperature Tbat has become lower than the first predetermined temperature TH1 at time t1. At this time, the discharging start voltage Vdisc is changed over from the first discharging start voltage Vdisc1, which is lower than the no-load output voltage Vdc0 of the substation, to the second discharging start voltage Vdisc2, which is higher than the Vdc0. Owing to the function of the voltage controller 203 in the AVR 220, therefore, the power converter 20 causes power of the secondary battery 1 to be discharged to the feeder side capacitor 3 and raises its voltage Vdc up to the Vdisc2. If the rolling stock starts acceleration at time t2, the voltage compensation apparatus 100 in this embodiment starts discharging. At this time, voltage Vdc on the feeder side (on the capacitor 3) of the power converter 20 is higher than the no-load output voltage Vdc0 of the substation 500. As for the supply of power to the power running rolling stock 600, therefore, power is supplied preferentially from the voltage compensation apparatus. The temperature Tbat of the secondary battery 1 exceeds the second predetermined temperature TH2 at time t3 because of internal heat generation of the secondary battery 1 caused by discharging from the battery. As a result, the discharging start voltage Vdisc is restored from the second discharging start voltage Vdisc2 to the first discharging start voltage Vdisc1. Immediately after the time t3, the discharging start voltage Vdisc falls, and consequently the supply of power from the secondary battery 1 is stopped and charge stored on the capacitor 3 is discharged to the rolling stock. As a result, the capacitor voltage Vdc falls. Since the voltage Vdc becomes equal to or lower than the discharging start voltage, however, discharging from the secondary battery 1 is conducted again. It is now supposed that the power running of the rolling stock is finished at time t4. Therefore, the capacitor 3 is charged by the output power of the substation 500. Furthermore, at this time, the capacitor voltage Vdc becomes equal to or higher than the discharging start voltage Vdisc and becomes lower than the charging start voltage Vabs. As for the current command value Iref of the voltage compensation apparatus 100 in the present embodiment, the current command value from the charging rate controller 204 is selected. Accordingly, charging and discharging are conducted so as to cause the charging rate SOC of the secondary battery 1 to follow the charging rate command value, such as 30[%].

It is now supposed that the rolling stock 600 starts regenerative running and surplus regenerative power has been generated at time t5. As the surplus regenerative power is generated, the capacitor 3 is charged by this regenerative power. At a point in time when the voltage Vdc has exceeded the charging start voltage Vabs, the current command value Iref in the voltage compensation apparatus 100 in the present embodiment is changed over to the command from the voltage controller 203 and charging to the secondary battery 1 is conducted, regenerative power being absorbed from the feeder 700.

According to this embodiment, heat generated by the secondary battery is increased to raise the temperature of the secondary battery, at low temperatures. Owing to the decrease of the internal resistance, the charging and discharging efficiency can be improved and the availability of the voltage compensation apparatus can be improved.

Furthermore, fluttering of the capacitor voltage can be suppressed by providing the relation between the temperature of the secondary battery and the discharging start voltage of the voltage compensation apparatus with hysteresis characteristics or continuously changing the discharging start voltage.

Second Embodiment

A second embodiment of the present invention will now be described with reference to FIGS. 6 and 7.

Figure 6:
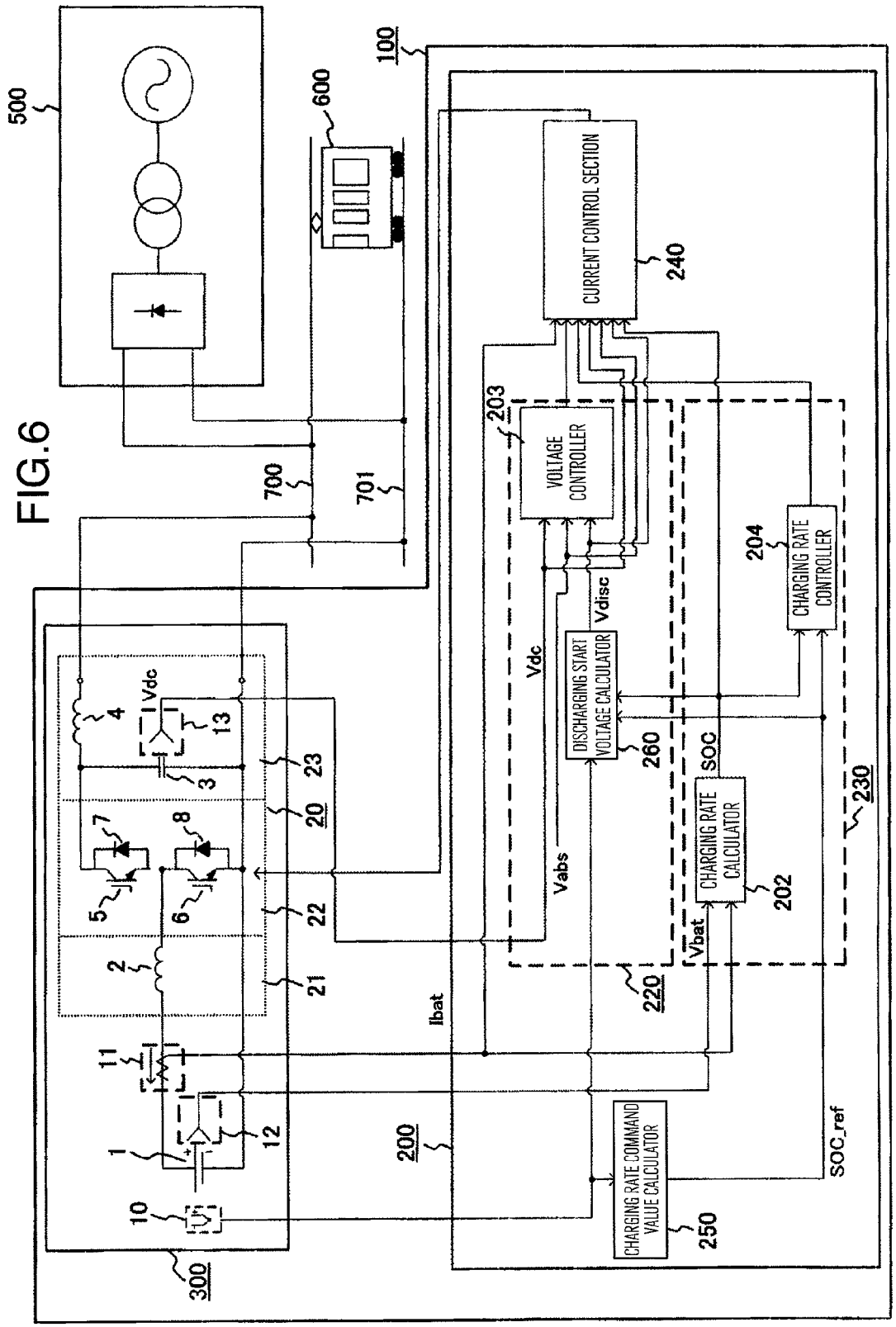
FIG. 6 is a general configuration diagram of an energy saving type feeder voltage compensation apparatus according to a second embodiment of the present invention.

FIG. 6 is a general configuration diagram of an energy saving type feeder voltage compensation apparatus according to the second embodiment of the present invention. The present embodiment differs from the first embodiment in that control for raising the charging rate is previously exercised when the temperature of the secondary battery has become low. After the charging rate has become high, the discharging start voltage Vdisc is altered to the second discharging start voltage Vdisc2, which is higher than the no-load output voltage Vdc0 of the substation in the same way as the first embodiment. As a result, it is possible to increase the quantity of power that can be discharged, before the discharging running. Therefore, a greater temperature rise at the time of discharging running is expected.

Hereafter, the same function units as those shown in FIG. 1 are denoted by like reference characters, and duplicated description will be omitted. Only points that are different from the preceding embodiment will be described.

If the detected temperature value Tbat detected by the temperature detector 10, which detects the temperature of the secondary battery 1, is equal to or lower than the first predetermined temperature TH1, a charging rate command value calculator 250 changes over the charging rate command value SOC_ref to a value SOC_ref2, which is higher than an ordinary command value SOC_ref1. Therefore, the output value SOC_ref becomes the charging rate command for the charging rate controller 204 to control the charging rate. A discharging start voltage calculator 260 is supplied with the charging rate SOC, the charging rate command value SOC_ref, and the detected temperature value Tbat of the secondary battery. When the following conditions are satisfied, the discharging start voltage Vdisc is changed over to the second discharging start voltage Vdisc2, which is higher than the no-load output voltage Vdc0 of the substation 500. The conditions are as follows: the charging rate command value is SOC_ref2; the charging rate SOC coincides with the command value; and the detected temperature value Tbat is equal to or lower than the second predetermined temperature TH2. If the detected temperature value Tbat of the secondary battery becomes equal to or higher than the second predetermined temperature TH2, the discharging start voltage Vdisc is restored to the first discharging start voltage Vdisc1, which is lower than the no-load output voltage Vdc0. The current control section 240 conducts the same operation as that in the first embodiment.

Operation of the voltage compensation apparatus in the present embodiment will now be described with reference to FIG. 7.

Figure 7:
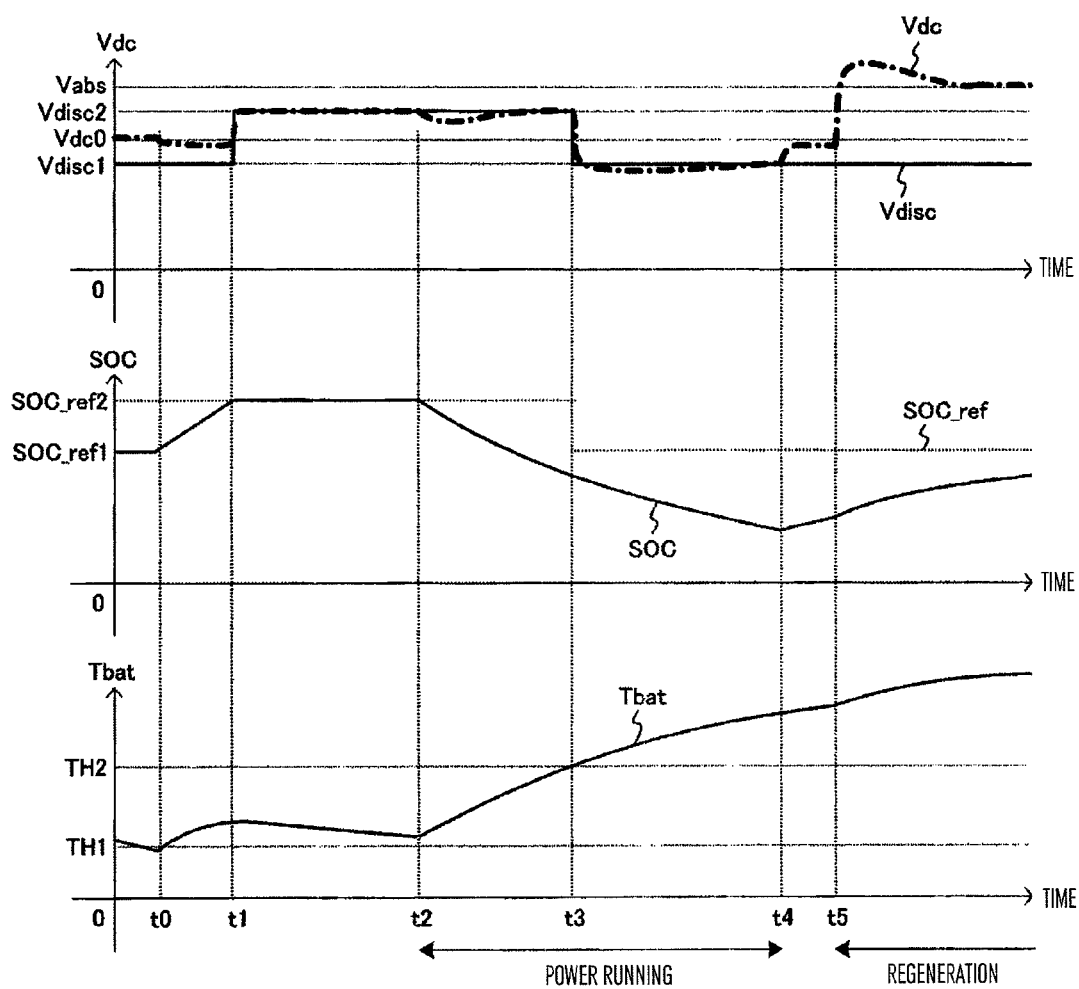
FIG. 7 is an operation waveform diagram of an energy saving type feeder voltage compensation apparatus according to a second embodiment of the present invention.

FIG. 7 is an operation waveform diagram of an energy saving type feeder voltage compensation apparatus according to the second embodiment of the present invention. The discharging start voltage Vdisc and the feeder side voltage (capacitor voltage) Vdc are shown in the top column of FIG. 7. The charging rate SOC is shown in the middle column. The temperature Tbat of the secondary battery 1 is shown in the bottom column.

It is now supposed that the detected temperature value Tbat of the secondary battery 1 has become lower than the first predetermined temperature TH1 at time t0. As a result, the charging rate command value calculator 250 changes over the charging rate command value SOC_ref from the SOC_ref1 to the SOC_ref2. If the charging rate command value SOC_ref becomes high, the voltage compensation apparatus 100 starts charging running by using the charging rate controller 204. Because of this charging running, the temperature of the secondary battery 1 slightly rises. If the charging rate SOC coincides with the charging rate command value SOC_ref at time t1, the discharging start voltage calculator 260 changes over the discharging start voltage Vdisc to second discharging start voltage Vdisc2, because the battery temperature Tbat is equal to or lower than the second predetermined temperature TH2. If the rolling stock starts power running at time t2, power is supplied preferentially from the voltage compensation apparatus 100 in the same way as the first embodiment. The ensuing operation is completely the same as that in the first embodiment.

In this way, the charging rate SOC of the secondary battery 1 is previously made high. As compared with the first embodiment, therefore, the power quantity that can be supplied to the power running rolling stock is increased. The temperature rise of the secondary battery 1 can be increased. As a result, the charging and discharging efficiency can be improved and the availability of the voltage compensation apparatus can be improved.

Third Embodiment

A third embodiment of the present invention will now be described with reference to FIG. 8.

Figure 8:
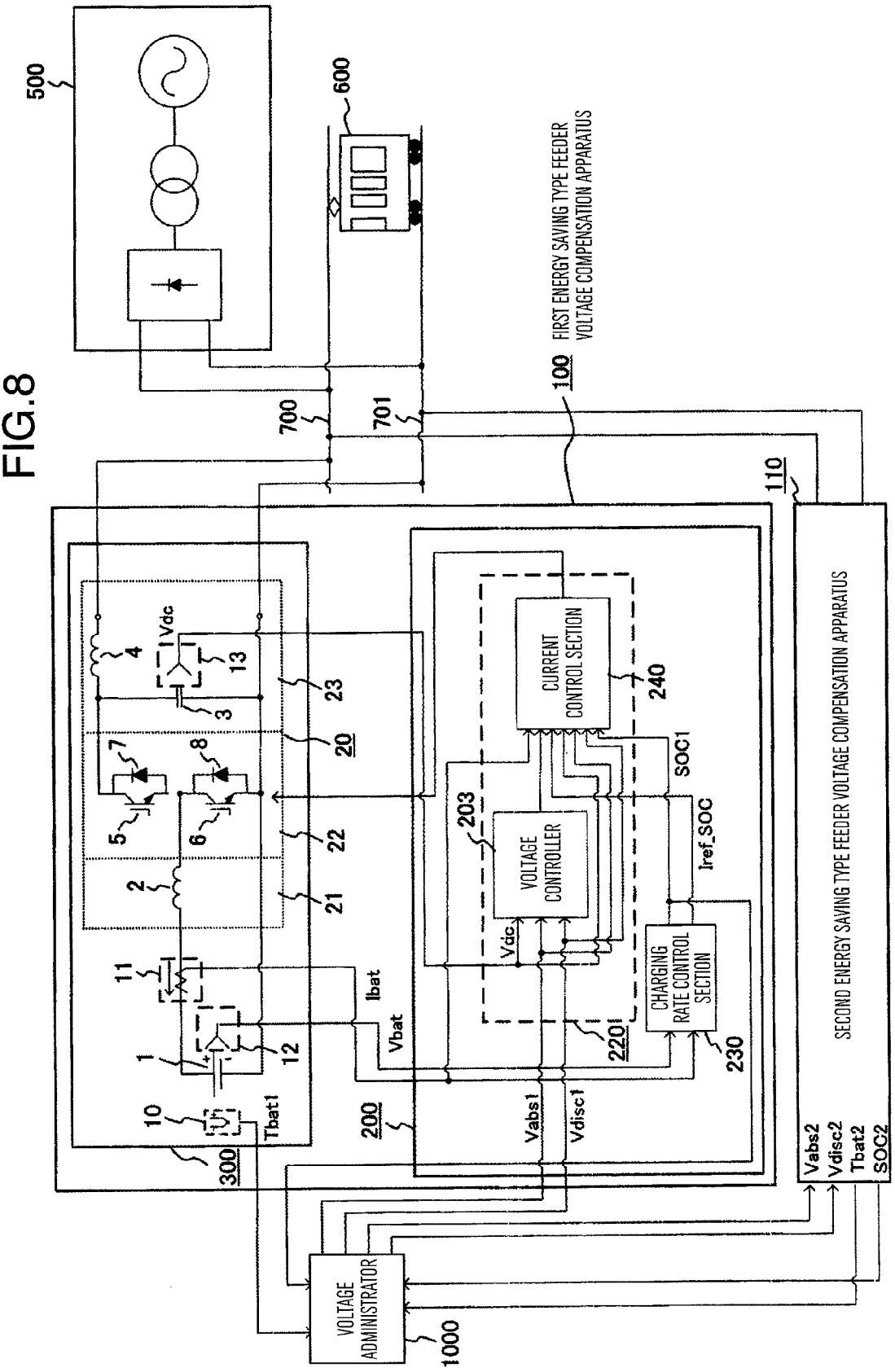
FIG. 8 is a general configuration diagram of an energy saving type feeder voltage compensation apparatus according to a third embodiment of the present invention.

FIG. 8 is a general configuration diagram of an energy saving type feeder voltage compensation apparatus according to the third embodiment of the present invention. The present embodiment differs from the first embodiment in that there are a plurality of energy saving type feeder voltage compensation apparatuses each including a secondary battery and a power converter. A voltage administrator for exercising general control over the energy saving type feeder voltage compensation apparatuses is provided. The voltage administrator outputs a charging start voltage and a discharging start voltage. As a result, charging and discharging of the secondary battery become possible even if the substation and the rolling stock are not connected.

Hereafter, only points that are different from the preceding embodiments will be described. In FIG. 8, the same function units as those shown in FIG. 1 are denoted by like reference characters, and duplicated description will be omitted.

In FIG. 8, first and second voltage compensation apparatuses 100 and 110 are provided. The first and second voltage compensation apparatuses 100 and 110 may be adjacent to each other or at a great distance from each other. The first and second voltage compensation apparatuses 100 and 110 have the same configuration. The voltage administrator 1000 is supplied with detected temperatures Tbat1 and Tbat2 of secondary batteries of respectively of the voltage compensation apparatuses 100 and 110 and charging rates SOC1 and SOC2 of the secondary batteries. The voltage administrator 1000 outputs the discharging start voltage and the charging start voltage to each of the voltage compensation apparatuses. In order to discriminate the discharging start voltages and the charging start voltages of the voltage compensation apparatuses 100 and 110, the discharging start voltage supplied to the voltage compensation apparatus 100 is denoted by Vdisc1, the charging start voltage supplied to the voltage compensation apparatus 100 by Vabs1, the discharging start voltage supplied to the voltage compensation apparatus 110 by Vdisc2, and the charging start voltage of the voltage compensation apparatus 110 by Vabs2.

If at least one of the detected secondary battery temperatures Tbat1 and Tbat2 becomes equal to or lower than the first predetermined temperature TH1, the voltage administrator 1000 sets the discharging start voltages and the charging start voltages so as to satisfy the expression (1).

$$Vabs1 > Vdisc1 > Vabs2 > Vdc0 > Vdisc2 \quad (1)$$

When this relation is satisfied, a voltage Vdc1 on the feeder side (capacitor 3) of the power converter 20 in the first voltage compensation circuit 100 is controlled toward Vdisc1. The voltage Vdc1 becomes higher than the charging start voltage Vabs2 of the second voltage compensation circuit 110. According to this, therefore, a voltage Vdc2 on the feeder side (capacitor 3) of the second voltage compensation apparatus 110 also becomes a high voltage (Vdc1≈Vdc2). The first voltage compensation apparatus 100 conducts discharging, and the second voltage compensation apparatus 110 starts charging. When a charging rate SOC1 of the secondary battery in the voltage compensation apparatus 100 has become equal to or lower than an allowable minimum value (for example, 20[%]) or a charging rate SOC2 of the secondary battery in the voltage compensation apparatus 110 has become equal to or higher than an allowable maximum value (for example, 80[%]), the voltage administrator 1000 changes over the discharging start voltages and the charging start voltages of the voltage compensation apparatuses 100 and 110 so as to satisfy the following expression (2).

$$Vabs2 > Vdisc2 > Vabs1 > Vdc0 > Vdisc1 \quad (2)$$

At this time, the feeder side voltage Vdc2 of the voltage compensation apparatus 110 becomes higher than the charging start voltage Vabs1 of the voltage compensation apparatus 100. As a result, the voltage compensation apparatus 110 conducts discharging, and the voltage compensation apparatus starts charging.

If both the detected temperatures Tbat1 and Tbat2 of the two secondary batteries exceed the second predetermined temperature TH2, the voltage administrator 1000 changes over the charging start voltages and the discharging start voltages so as to satisfy the following expression (3), and returns to the ordinary state.

$$Vabs1 = Vabs2 > Vdc0 > Vdisc1 = Vdisc2 \quad (3)$$

Even if the power running rolling stack is not present in the neighborhood, therefore, the temperatures of the secondary batteries can be raised by repeating charging and discharging between the voltage compensation apparatuses 100 and 110. Even if the power running rolling stock is present in the neighborhood, discharging toward the feeder 700 is conducted preferentially from a voltage compensation apparatus having a raised discharging start voltage, and consequently the temperature rise of the secondary battery is possible.

According to the present embodiment, charging and discharging among a plurality of voltage compensation apparatuses are possible. Even if a power running rolling stock is not present, therefore, temperatures of the secondary batteries can be kept high at low temperatures. As a result, the charging and discharging efficiency of the secondary batteries can be improved and the availability of the voltage compensation apparatuses can be improved.

Fourth Embodiment

A fourth embodiment of the present invention will now be described with reference to FIG. 9.

Figure 9:
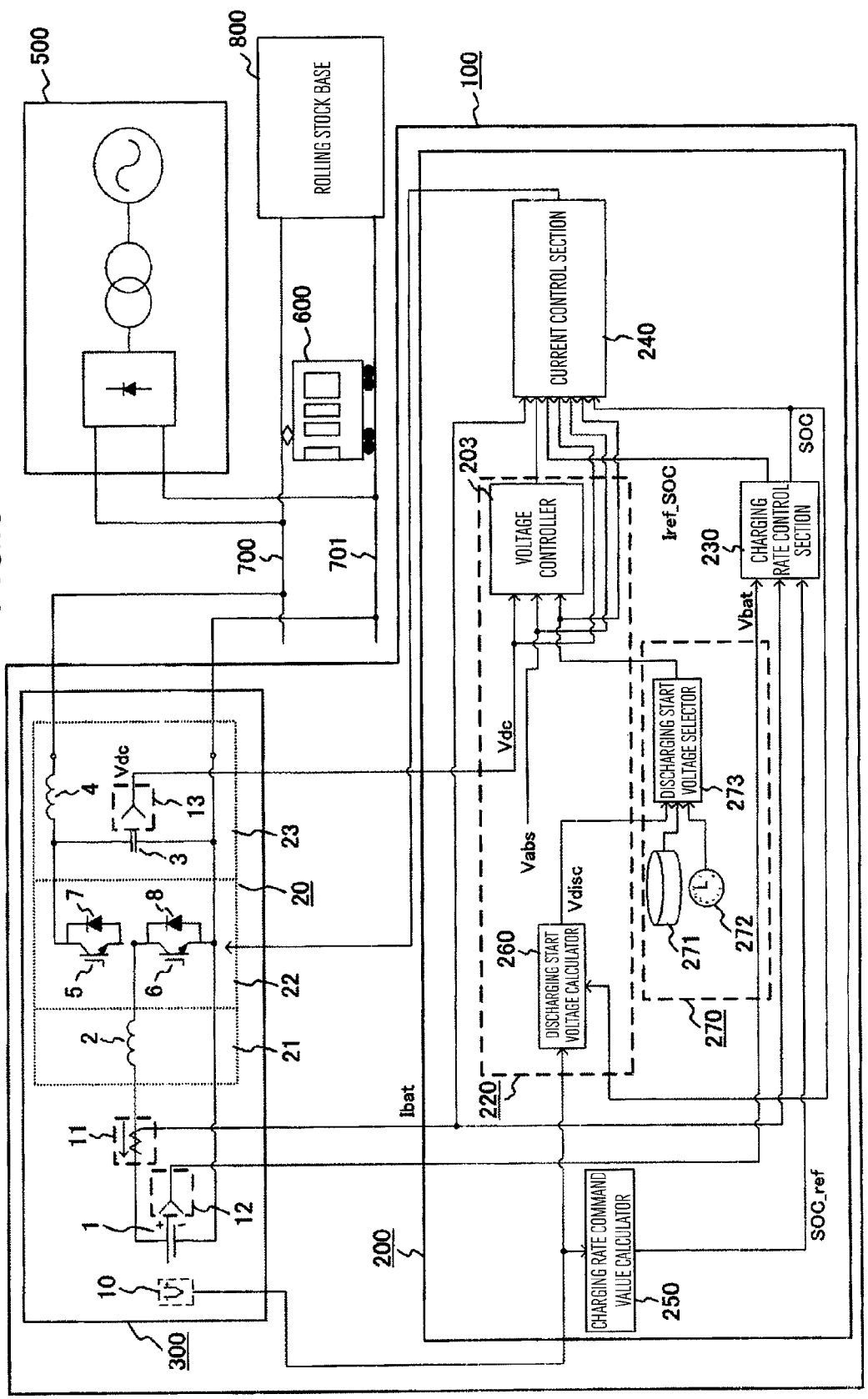
FIG. 9 is a general configuration diagram of an energy saving type feeder voltage compensation apparatus according to a fourth embodiment of the present invention.

FIG. 9 is a general configuration diagram of an energy saving type feeder voltage compensation apparatus according to the fourth embodiment of the present invention. The present embodiment aims at causing the voltage compensation apparatus to conduct charging operation at the time of running start of the voltage compensation apparatus. The present embodiment differs from the second embodiment only in that a charging rate adjustment section 270 is provided to lower the charging rate of the secondary battery when running for each day is finished.

The charging rate adjustment section 270 includes a memory 271 for storing a train schedule, a timer 272 for outputting current time, and a discharging start voltage changer 273. The discharging start voltage changer 273 conducts changeover from the discharging start voltage Vdisc to Vdisc2, which is higher than the no-load output voltage Vdc0 of the substation 500, over a time interval between arrival of the last service rolling stock on a connected line at the terminal station and the device shutdown. After the service running is finished, therefore, power running power and auxiliary machinery consumption power required for the rolling stock to move as far as the rolling stock base 800 are supplied preferentially from the voltage compensation apparatus 100. When the voltage compensation apparatus 100 is stopped after completion of the running for the day, therefore, the charging rate of the secondary battery 1 is low. At the time of running start on the next day, the charging rate SOC is lower than the charging rate command value SOC_ref. Therefore, the charging running is conducted at first, and the temperature rise of the secondary battery 1 is expected. As compared with the second embodiment, therefore, a greater temperature rise of the secondary battery 1 can be anticipated.

Hereafter, only points that are different from the second embodiment will be described. In FIG. 9, the same function units as those shown in FIG. 6 are denoted by like reference characters, and duplicated description will be omitted.

Output values of the memory 271 for storing the train schedule, the timer 272 for outputting the current time, and the discharging start voltage calculator 260 are input to the discharging start voltage changer 273. The discharging start voltage changer 273 recognizes time tlast when the last service running rolling stock on the line having the voltage compensation apparatus 100 arrives at the terminal station on the basis of the output value of the memory 271 and the output value of the timer 272. Until the time tlast, the discharging start voltage changer 273 outputs the output value Vdisc of the discharging start voltage calculator 260 as it is, to the voltage controller 203. Over a time interval between the time tlast and the running stop of the voltage compensation apparatus 100, the discharging start voltage changer 273 conducts changeover from the output value Vdisc of the discharging start voltage calculator 260 to the value Vdisc2, which is higher than the no-load output voltage Vdc0 of the substation 500, and outputs the Vdisc2 to the voltage controller 203. After the time tlast, therefore, the voltage compensation apparatus 100 supplies the power running power and consumed power of the auxiliary machinery required for the rolling stock 600 to move to the rolling stock base 800. It is thus possible to lower the charging rate of the secondary battery 1 to a value lower than the charging rate command value SOC_ref.

When running is started in the next morning, the charging rate SOC of the secondary battery 1 is lower than the charging rate command value SOC_ref. Therefore, charging running is conducted. At that time, a temperature rise of the secondary battery 1 is expected. Especially, if the temperature of the secondary battery 1 is lower than the first predetermined value TH1 when running is started in the next morning, then the charging rate command value for the secondary battery 1 at the time of running start becomes the greater SOC_ref2, and a greater temperature rise of the secondary battery 1 is expected.

Operation of the voltage compensation apparatus in the present embodiment will now be described with reference to FIG. 10.

Figure 10:
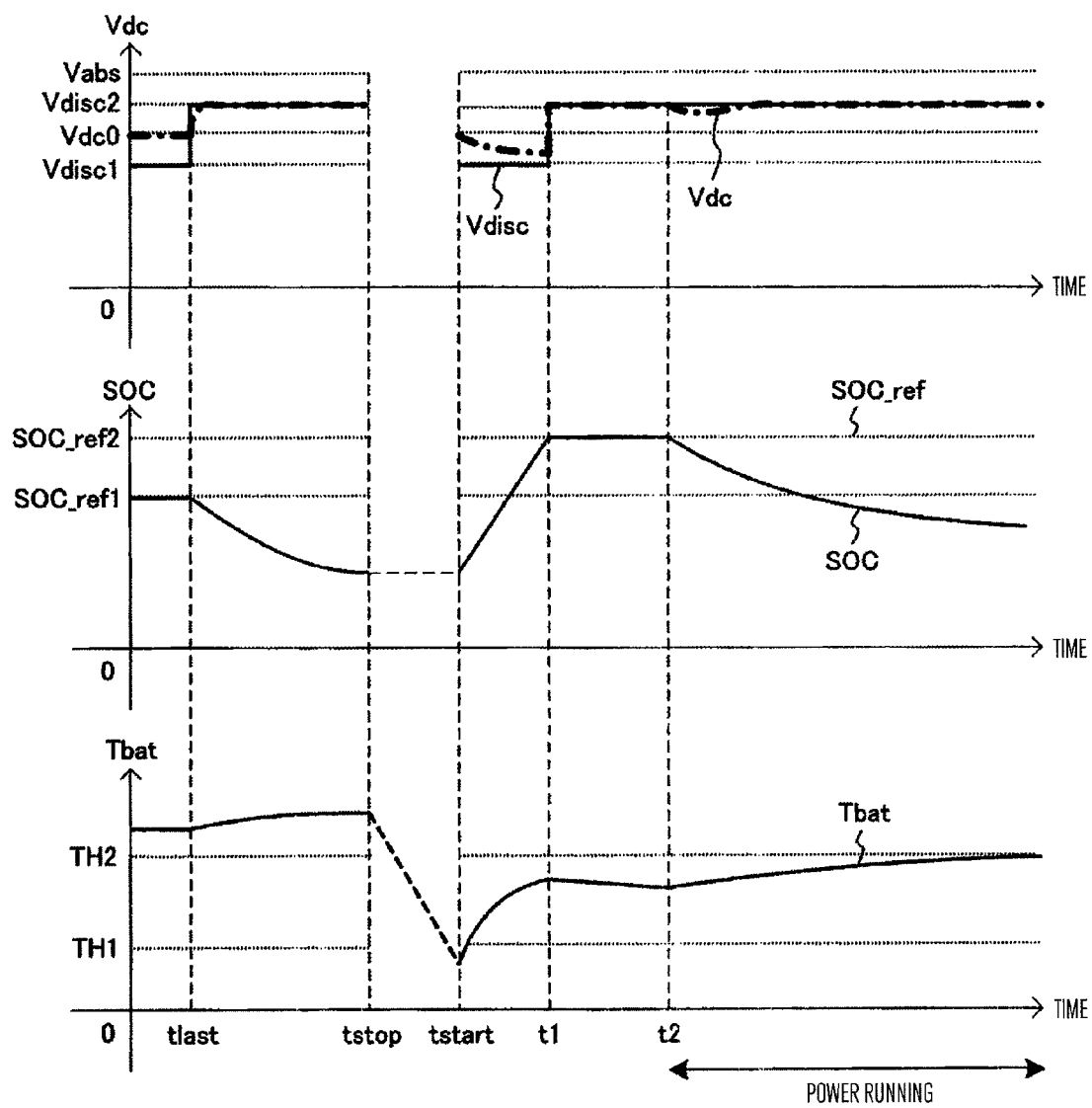
FIG. 10 is an operation waveform diagram of an energy saving type feeder voltage compensation apparatus according to a fourth embodiment of the present invention.

FIG. 10 is an operation waveform diagram of an energy saving type feeder voltage compensation apparatus according to the fourth embodiment of the present invention. The feeder side voltage (capacitor voltage) Vdc and the discharging start voltage Vdisc of power converter 20 are shown in the top column of FIG. 10. The charging rate SOC and the charging rate command value SOC_ref are shown in the middle column. The temperature Tbat of the secondary battery 1 is shown in the bottom column. The charging rate adjustment section 270 conducts changeover from the discharging start voltage Vdisc to Vdisc2 at the time tlast. As a result, power running power and auxiliary machinery consumption power required for the rolling stock to move as far as the rolling stock base 800 are supplied preferentially from the voltage compensation apparatus 100, resulting in a lowered charging rate of the secondary battery 1. The discharging start voltage Vdisc2 is higher than the no-load output voltage Vdc0 of the substation 500. Even if the charging rate of the secondary battery 1 falls, therefore, the current command value is determined on the basis of the current command value output from the voltage control section and the charging rate control is not exercised. At time tstop, the running of the voltage compensation apparatus 100 for the day is finished. When the voltage compensation apparatus 100 is started at running start time tstart on the next day, the discharging start voltage Vdisc is lower in value than the Vdc0. Therefore, the charging rate control is started, and the secondary battery 1 is charged so as to cause the charging rate SOC to follow the charging rate command value SOC_ref. During the charging running, Joule heat is generated by internal resistance in the secondary battery, and consequently the temperature of the secondary battery 1 rises. If the temperature of the secondary battery 1 is lower than the first predetermined temperature TH1 at the time of running start, then the charging rate command value SOC_ref is SOC_ref2, which is higher than the ordinary value, and consequently the charging running time becomes longer and a greater temperature rise of the secondary battery 1 is obtained. Since the charging rate coincides with the charging rate command value at time t1, the discharging start voltage calculator 260 changes over the discharging start voltage Vdisc to the higher Vdisc2. If the rolling stock 600 starts the power running at time t2, power required for the power running is supplied preferentially from the voltage compensation apparatus 100.

According to the present embodiment, heat generated in the secondary battery is increased at low temperatures. As a result, the temperature of the secondary battery is kept high. Accordingly, the charging and discharging efficiency of the secondary battery can be improved, and the availability of the voltage compensation apparatus can be improved.

Furthermore, since the running of the voltage compensation apparatus for the day is finished with the charging rate of the secondary battery being lowered, the charging running is first conducted when running is started on the next day. Even before the discharging running to the rolling stock is started, a temperature rise of the secondary battery is obtained owing to the charging running. Accordingly, a further temperature rise of the secondary battery can be anticipated.

It should be further understood by those skilled in the art that although the foregoing description has been made on embodiments of the invention, the invention is not limited thereto and various changes and modifications may be made without departing from the spirit of the invention and the scope of the appended claims.

What we claim is:

1. An energy saving type feeder voltage compensation apparatus including a power converter connected between a feeder and an electric energy storage apparatus so as to give and receive power in a bilateral direction, and a control apparatus for causing surplus power on the feeder to charge the electric energy storage apparatus by using the power converter and causing the electric energy storage apparatus to be discharged using the power converter in response to feeder power demand from a power running rolling stock, said energy saving type feeder voltage compensation apparatus comprising:

discharging start means for causing discharging from the electric energy storage apparatus to the feeder side to be started when a predetermined discharging start condition is satisfied;

temperature detection means for detecting a temperature of the electric energy storage apparatus; and discharging condition expansion means for expanding the discharging start condition in response to the detected temperature becoming lower than a predetermined temperature.

2. An energy saving type feeder voltage compensation apparatus according to claim 1, wherein the discharging start condition is that a feeder side voltage of the power converter has fallen to a predetermined discharging start voltage, and said discharging condition expansion means comprises means for raising the discharging start voltage when the temperature of the electric energy storage apparatus has become lower than the predetermined temperature.

3. An energy saving type feeder voltage compensation apparatus according to claim 1, wherein the discharging start condition is that a feeder side voltage of the power converter has fallen to a predetermined discharging start voltage, and said discharging condition expansion means comprises means for raising the discharging start voltage to at least a no-load output voltage of a substation which feeds power to the feeder, when the temperature of the electric energy storage apparatus has become lower than the predetermined temperature.

4. An energy saving type feeder voltage compensation apparatus according to claim 1, comprising:

charging start means for causing the electric energy storage apparatus to be charged when a feeder side voltage of the power converter is higher than a predetermined charging start voltage; and discharging start means for causing the electric energy storage apparatus to be discharged when the feeder side voltage of the power converter is lower than a discharging start voltage which is lower than the charging start voltage, wherein said discharging condition expansion means comprises means for raising the discharging start voltage when the temperature of the electric energy storage apparatus has become lower than the predetermined temperature.

5. An energy saving type feeder voltage compensation apparatus according to claim 1, comprising:

charging start means for causing the electric energy storage apparatus to be charged when a feeder side voltage of the power converter is higher than a predetermined charging start voltage;

discharging start means for causing the electric energy storage apparatus to be discharged when the feeder side voltage of the power converter is lower than a discharging start voltage which is lower than the charging start voltage; and charging rate control means for controlling charging and discharging so as to cause a charging rate of the electric energy storage apparatus to approach a predetermined charging rate when the feeder side voltage of the power converter is between the charging start voltage and the discharging start voltage, wherein said discharging condition expansion means comprises means for raising the discharging start voltage when the temperature of the electric energy storage apparatus has become lower than the predetermined temperature.

6. An energy saving type feeder voltage compensation apparatus according to claim 1, comprising:

charging start means for causing the electric energy storage apparatus to be charged when a feeder side voltage of the power converter is higher than a predetermined charging start voltage;

discharging start means for causing the electric energy storage apparatus to be discharged when the feeder side voltage of the power converter is lower than a discharging start voltage which is lower than the charging start voltage; and charging rate control means for controlling charging and discharging so as to cause a charging rate of the electric energy storage apparatus to approach a predetermined charging rate when the feeder side voltage of the power converter is between the charging start voltage and the discharging start voltage, wherein said discharging condition expansion means comprises:

means for raising the discharging start voltage when the temperature of the electric energy storage apparatus has become lower than a first predetermined temperature; and means for lowering the discharging start voltage when the temperature of the electric energy storage apparatus has become higher than a second predetermined temperature which is higher than the first predetermined temperature.

7. An energy saving type feeder voltage compensation apparatus according to claim 1, comprising:

charging start voltage setting means for setting a charging start voltage, the charging start voltage being higher than a no-load output voltage of a substation which supplies power to the feeder;

discharging start voltage setting means for setting a discharging start voltage, the discharging start voltage being lower than the no-load output voltage of the substation;

means for raising the discharging start voltage to become higher than the no-load output voltage of the substation when the temperature of the electric energy storage apparatus has become lower than a predetermined temperature; and a voltage control section for controlling the power converter so as to cause the feeder side voltage of the power converter to be between the charging start voltage and the discharging start voltage.

8. An energy saving type feeder voltage compensation apparatus according to claim 7, comprising:

a voltage detector for detecting the feeder side voltage of the power converter;

a battery voltage detector for detecting a terminal voltage of the electric energy storage apparatus;

a current detector for detecting a charging current of the electric energy storage apparatus;

a temperature detector for detecting the temperature of the electric energy storage apparatus;

charging rate calculation means for calculating a charging rate of the electric energy storage apparatus on the basis of a detected terminal voltage value and a detected current value of the electric energy storage apparatus;

charging rate target setting means for setting a target value of the charging rate for the electric energy storage apparatus; and a charging rate control section for controlling the power converter so as to cause the charging rate of the electric energy storage apparatus to approach the target value of the charging rate when the feeder side voltage of the power converter is between the charging start voltage and the discharging start voltage.

9. An energy saving type feeder voltage compensation apparatus according to claim 1, comprising:

charging start means for causing the electric energy storage apparatus to be charged when a feeder side voltage of the power converter is higher than a predetermined charging start voltage;

discharging start means for causing the electric energy storage apparatus to be discharged when the feeder side voltage of the power converter is lower than a discharging start voltage which is lower than the charging start voltage; and charging rate control means for controlling charging and discharging so as to cause a charging rate of the electric energy storage apparatus to approach a predetermined target value when the feeder side voltage of the power converter is between the charging start voltage and the discharging start voltage, wherein said discharging condition expansion means comprises:

means for raising the target value of the charging rate and raising the discharging start voltage when the temperature of the electric energy storage apparatus has become lower than a predetermined temperature.

10. An energy saving type feeder voltage compensation apparatus according to claim 1, comprising:

charging start means for causing charging the electric energy storage apparatus from the feeder side to be started when a predetermined charging start condition is satisfied; and second discharging condition expansion means for expanding the discharging start condition near a last train time of a train schedule using the feeder.

11. An energy saving type feeder voltage compensation apparatus according to claim 10, wherein said charging start means comprises means for causing the electric energy storage apparatus to be discharged when the feeder side voltage of the power converter is lower than a predetermined discharging start voltage, and said second discharging condition expansion means comprises means for raising the discharging start voltage near the last train time of the train schedule using the feeder.

12. An energy saving type feeder voltage compensation apparatus according to claim 1, comprising discharging current limiting means for limiting a discharging current from the electric energy storage apparatus, wherein said discharging condition expansion means comprises means for raising a limit value given by said discharging current limiting means when the detected temperature of the electric energy storage apparatus has become lower than a predetermined temperature.

13. An energy saving type feeder voltage compensation apparatus including two voltage compensation apparatuses connected to a feeder supplied with power from a substation, electric energy storage apparatuses respectively provided in the voltage compensation apparatuses, power converters respectively provided in the voltage compensation apparatuses so as to give and receive power in a bilateral direction between the feeder and the electric energy storage apparatuses, and control apparatuses for causing surplus power on the feeder to charge the electric energy storage apparatuses by using the power converters and causing the electric energy storage apparatuses to be discharges using the power converters in response to feeder power demand from a power running rolling stock, said energy saving type feeder voltage compensation apparatus comprising:

discharging start means respectively provided in the voltage compensation apparatuses to cause discharging from the electric energy storage apparatuses to the feeder side to be started when a predetermined discharging start condition is satisfied;

temperature detection means respectively for detecting temperatures of the electric energy storage apparatuses; and discharging condition expansion means for expanding the discharging start condition in one of the voltage compensation apparatuses in response to at least one of the detected temperatures becoming lower than a predetermined temperature.

14. An energy saving type feeder voltage compensation apparatus according to claim 13, wherein said discharging condition expansion means comprises means for restoring the discharging start condition of one of the voltage compensation apparatuses to an original state from a state in which the discharging start condition of the voltage compensation apparatus is expanded, and expanding the discharging start condition of the other of the voltage compensation apparatuses, when a predetermined condition is satisfied.

15. An energy saving type feeder voltage compensation apparatus according to claim 14, comprising means for setting the predetermined condition to that the charging rate of the electric energy storage apparatus in one of the voltage compensation apparatuses has fallen to a predetermined value or that the charging rate of the electric energy storage apparatus in the other of the voltage compensation apparatuses has risen to a predetermined value.

16. An energy saving type feeder voltage compensation method using a power converter connected between a feeder and an electric energy storage apparatus so as to give and receive power in a bilateral direction, to cause surplus power on the feeder to charge the electric energy storage apparatus and cause the electric energy storage apparatus to be discharged in response to feeder power demand from a power running rolling stock, said energy saving type feeder voltage compensation method comprising the steps of:

causing discharging from the electric energy storage apparatus to the feeder side to be started when a predetermined discharging start condition is satisfied;

detecting a temperature of the electric energy storage apparatus; and expanding the discharging start condition in response to the detected temperature becoming lower than a predetermined temperature.

17. An energy saving type feeder voltage compensation method according to claim 16, wherein the discharging start condition is that a feeder side voltage of the power converter has fallen to a predetermined discharging start voltage, and said energy saving type feeder voltage compensation method comprises the step of raising the discharging start voltage when the temperature of the secondary battery has become lower than the predetermined temperature.

18. An energy saving type feeder voltage compensation method according to claim 16, wherein the discharging start condition is that a feeder side voltage of the power converter has fallen to a predetermined discharging start voltage, and said energy saving type feeder voltage compensation method comprises the step of raising the discharging start voltage to at least a no-load output voltage of a substation which feeds power to the feeder, when the temperature of the electric energy storage apparatus has become lower than the predetermined temperature.

19. An energy saving type feeder voltage compensation method according to claim 16, comprising the steps of:

causing the electric energy storage apparatus to be charged when a feeder side voltage of the power converter is higher than a predetermined charging start voltage;

causing the electric energy storage apparatus to be discharged when the feeder side voltage of the power converter is lower than a discharging start voltage which is lower than the charging start voltage; and raising the discharging start voltage when the temperature of the secondary electric energy storage apparatus has become lower than the predetermined temperature.

20. An energy saving type feeder voltage compensation method according to claim 16, comprising the steps of:

causing the electric energy storage apparatus to be charged when a feeder side voltage of the power converter is higher than a predetermined charging start voltage;

causing the electric energy storage apparatus to be discharged when the feeder side voltage of the power converter is lower than a discharging start voltage which is lower than the charging start voltage;

controlling charging and discharging so as to cause a voltage of the electric energy storage apparatus to approach a predetermined charging voltage when the feeder side voltage of the power converter is between the charging start voltage and the discharging start voltage; and raising the discharging start voltage when the temperature of the electric energy storage apparatus has become lower than the predetermined temperature.

* * * * *